Patented Oct. 12, 1943

2,331,282

UNITED STATES PATENT OFFICE 2,331,282

TREATMENT OF DRILLING FLUIDS

Truman B. Wayne, Houston, Tex.

No Drawing. Application June 5, 1939,
Serial No. 277,565

6 Claims. (Cl. 252—8.5)

This invention relates generally to the treatment of mud-laden or drilling fluids, and particularly to the treatment of such fluids as are employed in the rotary drilling of oil and gas wells so as to improve the physical properties of said fluids.

The fluid employed for rotary drilling operations may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult.

It is an object of the present invention, generally stated, to provide a process and agent for the treatment of mud-laden or drilling fluids in order to control the viscosity and thixotropic properties thereof.

Another object of the invention is to provide a process and agent for treating such fluids whereby the properties of the hydrated clay colloids are modified and the viscosity of the fluid reduced.

A further object of the invention is to provide a mud-laden or drilling fluid and the process of making it in which the properties of the colloidal matter or gel constituent in the fluid are substantially modified and rendered suitable for rotary drilling purposes.

A more specific object of this invention is to provide a process and agent for the treatment of mud-laden or drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

In accordance with the present invention, generally stated, a mud-laden fluid such as that employed in the rotary drilling of oil wells may be treated with a chemical agent which, upon reaction with certain constituents of the fluid, modifies the colloidal properties of the colloidal matter in the fluid. More specifically, in accordance with the present invention, the degelling action on the mud-laden fluid is produced by a class of chemical substances which are herein described as complex "nitrogenous organic esters of phosphorus acids." This application is a continuation in part of the subject matter of my prior application, Serial No. 164,528, filed September 28, 1937, issued into Patent No. 2,216,865 on October 8, 1940, as a continuation of my earlier application, Serial No. 71,179, filed March 27, 1936, in which phosphoric acid esters of organic hydroxy bodies were disclosed. The present invention is distinguished from the subject matter of the above-mentioned applications by the fact that amino groups or substituted amino groups are additionally present in the molecule. The amino group is hydrophilic in character, and, aside from providing additional points in the complex molecule wherein a strongly hydrophilic phosphorus acid group may be introduced, it enhances the water-wettability and/or solubility of the molecule.

In illustration of this distinction, the phosphorus acid esters of an hydroxyanthraquinone would properly be classed with the substances covered by my prior application, Serial No. 164,-528, filed September 18, 1937. However, generally, phosphorus acid esters of hydroxyalkylaminoanthraquinones are preferred reagents, and improvements in the processes of degelling mud-laden or rotary drilling fluids employing such organic amino-phosphorous esters are claimed in the present application. Other similar nitrogenous organic esters of phosphorus acids are also disclosed as suitable degelling agents in the present invention.

U. S. Patent No. 2,104,286 to Baumann disclosed the preparation of a number of phosphorous or phosphoric acid compounds prepared by partly esterifying phosphoric acid with amino anthraquinones. Generally, phosphorous acid esters of hydroxyalkylaminoanthraquinones are preferred by Baumann as acid wool dyes, and a list of specific aminoanthraquinone derivatives are given in lines 31 to 48 inclusive on page 1, column 1, of his patent. In all of the above compounds, the hydroxyalkyl radical or radicals are attached to the aromatic nucleus through an intervening amino residue. Compounds suitable for my purpose are not restricted to this structure as the amino group or residue may suitably appear at other points in the molecule. The amino group or residue may be attached to the aromatic nucleus through an intervening ester radical or an intervening acyl residue, or by other means.

Suitable nitrogenous esters of ortho, meta, pyro, tetra, and other acids of phosphorus are suitable. Esters or ether bodies prepared by analogous procedure with phosphorus pentoxide are likewise contemplated. The amino-substituted aromatic body may be an aromatic compound such as amino-benzene, amino-naphthalene, amino-anthracene, or other non-hydroxy aromatic body, or may be an amino-substituted phenolic body such as amino-resorcinol, amino-naphthol, amino-pyrogallol, or other amino-phenol. Amino derivatives of aromatic alcohols, aldehydes, ketones, quinones, etc., are likewise suitable. If inherently hydroxy, such as are the amino-phenols, they may be reacted without further modification with the phosphorus acid, anhydride, or halogenide to form the nitrogenous esters of a phosphorus acid which are useful in the present invention. If non-hydroxy, or where further hydroxylation is desirable, a suitable hydroxyalkylamino aromatic compound may be prepared by reacting the aromatic amino compound with glycol mono- and di-chlorohydrins or the corresponding chlorohydrins of glycerol or other polyhydric alcohols. This procedure is commonly carried out by dissolving the aromatic amino compound in a suitable inert solvent, adding the alkyl chlorohydrin, and refluxing until the reaction is substantially complete. The mixture is then made strongly alkaline with sodium or potassium hydroxide and the amine layer removed. After drying thoroughly, it may then be reacted with the phosphorus acid, anhydride, or halogenide in the manner disclosed either in Baumann Patent No. 2,104,286, or in the examples which follow.

A second species of the general class of substances herein described as "nitrogenous organic esters of phosphorus acids" are the phosphoric acid esters described in my copending application, Serial No. 152,275, dated July 6, 1937, disclosing and claiming such esters. These esters are characterized in the above-mentioned application as "nitrogenous hydrophilic esters of a water-soluble polybasic acid or its chloride or anhydride, characterized by one or more ester radicals containing a residue from a polyhydroxy body," and when the polybasic acid is a phosphorus acid the ester is a suitable member of the general class of substances described in the present application as useful degelling agents for well drilling fluids.

In order to illustrate the principles of my invention, a number of specific examples are hereinafter given. However, it should be distinctly understood that I do not confine myself to the specific treating agents, drilling fluid compositions or proportions hereinafter disclosed, as it should be understood by those skilled in the art that variations from these disclosures do not depart from the principles and spirit of my invention which is directed in a general way to the use of "nitrogenous organic esters of phosphorus acids" which are hydrophilic in character and characterized by the pressure of one or more amino residues and one or more ester radicals containing a residue from a hydroxylated body, in the degelling and controlling of the viscosity of mud-laden or rotary drilling fluids.

EXAMPLE 1

A polyphosphoric acid such as tetraphosphoric acid is reacted with an alkylolamine such as triethanolamine, and the resulting compound is then reacted with a polyhydroxy substance to form an ester. 338 parts of tetraphosphoric acid and an inert solvent such as triethyl phosphate, ortho-dichlorobenzene or trichlorobenzene are placed in a suitable vessel provided with cooling coils or jacket and 140 parts of commercial triethanolamine are slowly added while maintaining the temperature below 50° C. 300 parts of powdered dry quebracho extract containing approximately 72% of tannins are added and the mass is heated at 150° C. for two hours. The finished product is a heavy, resinous, brown, tarry substance, fully soluble in water. It is freed of the inert solvent by distillation and may be used as the acid mass, or after neutralizing with soda, ammonia, or water soluble amine. Tests on a drilling mud are shown in Table I.

EXAMPLE 2

A non-hydroxy alkylamine or cycloalkylamine is reacted with phosphoric acid, and the resulting salt or amide is reacted with a polyhydroxy substance to form an ester. As a specific example, 100 parts of cyclohexylamine are slowly added to 338 parts of tetraphosphoric acid while cooling to form the amine salt. Amide formation may occur at higher temperatures, and while this is not objectionable if the final ester has sufficient water solubility, no particular advantage results from amide formation at this stage. To the amine salt is added 170 parts of technical pyrogallol, and the mass is stirred and heated at 100° to 200° C. for several hours. An inert solvent may be used to carry out water of reaction. The final product may be used in the unneutralized state, or any residual acidity may be neutralized with soda, ammonia, or a water soluble amine. Tests on a drilling mud are shown in Table I.

EXAMPLE 3

A modification of Example 1 produces a product differing somewhat in structure and properties. 300 parts of dry quebracho extract are dissolved in 140 parts of triethanolamine while stirring in a vessel equipped for stirring plastic masses. To the amine salt of the polyphenolic quebracho compound are added 215 parts of 90% phosphoric acid and the mass is heated at 100°–150° C. or higher, for four hours, or until a satisfactory degree of esterification has been attained. The plastic mass is fully soluble in water and may be used without further treatment, or may be neutralized with soda, ammonia, or a water soluble amine. Tests on a drilling mud are shown in Table I.

Tetraphosphoric acid is the preferred phosphoric acid in the above syntheses because of its anhydrous condition. Ordinary 85% orthophosphoric acid is preferably concentrated to at least 90% strength before using, as esterification precedes with greater facility with the more anhydrous phosphoric acids, or their corresponding anhydrides. While these anhydrous forms of phosphoric acid are preferably used for this reason, it is doubtless true that these and even glacial metaphosphoric acid, if used, produce a final product containing considerable proportions of esters of orthophosphoric acid because water formed during esterification is difficult to remove from the mass even with an inert solvent capable of forming an azeotropic mixture. Water, if present and absorbed by the concentrated polyphosphoric acid, will doubtless form the ortho-acid.

Phosphorus pentoxide may be used instead of phosphoric acids. With hydroxy bodies under properly controlled conditions, it yields analogous esters by addition.

The tests described in Table I were conducted on a well drilling fluid prepared from Wyoming bentonite, a commerical mud base, and water. The concentration of bentonite was 8 per cent by weight, and the initial viscosity of the fluid was 36 centipoises at 600 R. P. M. in a Stormer viscosimeter, at 20–25° C.

Table I

| Source of ester | Proportion used | Volume of drilling fluid | Initial viscosity | Final viscosity |
|---|---|---|---|---|
| | Grams | Milliliters | Centipoises | Centipoises |
| Example 1 | 0.10 | 100 | 36 | 15 |
| Do | 0.20 | 100 | 36 | 8 |
| Example 2 | 0.10 | 100 | 36 | 18 |
| Do | 0.20 | 100 | 36 | 10 |
| Example 3 | 0.10 | 100 | 36 | 16 |
| Do | 0.20 | 100 | 36 | 9 |

EXAMPLE 4

A phosphorus acid ester of 1-hydroxyethylaminoanthraquinone, prepared according to Example 1 of Baumann Patent No. 2,104,286, was used in the degelling of an aqueous 8 per cent Wyoming bentonite drilling fluid having an initial viscosity of 35 centipoises at 600 R. P. M. in a Stormer viscosimeter. Results obtained through the use of varying proportions of this compound are tabulated in Table II.

EXAMPLE 5

A phosphorus acid ester of 1:4-dihydroxyethylaminoanthraquinone, prepared according to Example 2 of Baumann Patent No. 2,104,286, was used in various proportions on other portions of the same drilling fluid described in Example 4. Results are tabulated in Table II.

EXAMPLE 6

The same as Example 4, except that a phosphorus acid ester of 1-hydroxyethylamine-4-bromoanthraquinone, prepared according to Example 3 of Baumann Patent No. 2,104,286, was used. Results are tabulated in Table II.

Table II

| Phosphorus acid ester described in— | Viscosity in centipoises at various ratios (grams of phosphorus acid ester per 100 ml. of drilling fluid) | | | | |
|---|---|---|---|---|---|
| | 0.02 | 0.05 | 0.10 | 0.20 | 0.40 |
| Original drilling fluid | 35 | 35 | 35 | 35 | 35 |
| Example 4 | 23 | 21 | 19 | 17 | 15 |
| Example 5 | 23 | 19 | 19 | 17 | 15 |
| Example 6 | 23 | 21 | 19 | 17 | 13 |

These esters may be used in any proportion ranging between 0.01 gram to 1.0 gram per 100 ml. of drilling fluid, depending on the initial viscosity and other characteristics of the drilling fluid, as well as the characterstics desired in the treated drilling fluid.

The preceding examples exemplify the use of my improved degelling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid.

Wyoming bentonite was used with water in compounding the drilling fluids used in the preceding examples because of its ready availability and concentrated colloidal nature. Other clays, shales, and earthy materials are likewise acted upon, as the colloidal fraction of such materials is like-wise a gel-forming alumino-silicate complex. They, therefore, are likewise adapted for use in the preceding examples, or in actual well drilling operations.

For instance, wherein a normal 8 per cent suspension of bentonite in water may have a viscosity of 36 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatments with my improved treating agent to produce normal viscosities for muds so contaminated.

While it is seldom necessary to use my improved degelling agents in connection with other degelling agents, they may be used in conjunction with, or in admixture with, alkalies, tannins, alkali tannates, inorganic phosphates, borates, silicates and/or other substances which have been proposed for this purpose.

The reagent may conveniently be added to the well drilling fluids in any of the methods of addition commonly practiced, i. e., in the mud circulating system in the ditches, sump, or at the pump suction. It may be added in aqueous solution or in dry admixture with mud bases or weighting materials which commonly are added during the drilling operation.

The reagent embodying this invention is highly efficient and stable as distinguished from some of the inorganic phosphates, such as the hexametaphosphate which, at higher temperatures, is converted into the orthophosphate, thereby detracting from its efficiency. This is important because the temperature at the bottom of a deep well is frequently in the neighborhood of the boiling point of water.

The term "phosphorus acid" as used in the following claims is also intended to include the corresponding anhydride and halogenide of phosphorus. Anhydrides produce the corresponding phosphorus acid when hydrated, or, conversely, the anhydride is yielded when the corresponding acid is dehydrated. Halogenides react directly to form the corresponding ester, and any remaining halogen atoms may readily be converted to the corresponding phosphorus acid groups by hydrolysis.

While in the foregoing, theories are advanced, these are put forward to facilitate the understanding of the objects and purposes of this invention; it is to be understood, however, that this invention is not dependent upon or limited to any theory put forward.

What is claimed is:

1. The process of controlling the viscosity of an aqueous mud-laden well-drilling fluid subject to viscosity variations, comprising, adding thereto a small proportion of a viscosity-reducing compound, which compound is a hydrophilic ester of a phosphorus acid, characterized by the presence therein of at least one amino residue from an amine selected from the group consisting of non-hydroxy alkyl, cycloalkyl, aralkyl, and aryl amines, and at least one ester radical containing a residue from a hydroxy body of the aromatic series.

2. The process of controlling the viscosity of an aqueous mud-laden well-drilling fluid subject to viscosity variations, comprising, adding thereto a small proportion of a hydrophilic ester of a phosphorus acid, characterized by the presence therein of at least one amino residue from an amine selected from the group consisting of non-hydroxy alkyl, cycloalkyl, aralkyl, and aryl amines, and at least one ester radical containing a residue from a polyhydroxy body of the aromatic series.

3. An aqueous mud-laden well-drilling fluid subject to viscosity variations, containing a relatively small proportion of a viscosity-reducing compound, which compound is a hydrophilic ester of a phosphorus acid, characterized by the presence therein of at least one amino residue from an amine selected from the group consisting of non-hydroxy alkyl, cycloalkyl, aralkyl, and aryl amines, and at least one ester radical containing a residue from a hydroxy body of the aromatic series.

4. The process of controlling the viscosity of an aqueous mud-laden well-drilling fluid subject to viscosity variations, comprising, adding thereto a small proportion of a viscosity-reducing compound, which compound is an ester of a polyphosphoric acid, characterized by the presence therein of at least one amino residue from an amine selected from the group consisting of non-hydroxy alkyl, cycloalkyl, aralkyl, and aryl amines, and at least one ester radical containing a residue from a hydroxy body of the aromatic series.

5. An aqueous mud-laden well-drilling fluid subject to viscosity variations, containing a relatively small proportion of a viscosity-reducing compound, which compound is a hydrophilic ester of a polyphosphoric acid, characterized by the presence therein of at least one amino residue from an amine selected from the group consisting of non-hydroxy alkyl, cycloalkyl, aralkyl, and aryl amines, and at least one ester radical containing a residue from a hydroxy body of the aromatic series.

6. An aqueous mud-laden well-drilling fluid subject to viscosity variations, containing a relatively small proportion of a viscosity-reducing compound, which compound is a hydrophilic ester of a phosphorus acid, characterized by the presence therein of at least one amino residue from an amine selected from the group consisting of non-hydroxy alkyl, cycloalkyl, aralkyl, and aryl amines, and at least one ester radical containing a residue from a polyhydroxy body of the aromatic series.

TRUMAN B. WAYNE.